(12) United States Patent
Kipping et al.

(10) Patent No.: US 6,192,765 B1
(45) Date of Patent: Feb. 27, 2001

(54) PLANARITY MEASURING ROLLER

(75) Inventors: Matthias Kipping; Matthias Tuschhoff, both of Siegen; Martin Braun, Kreuztal; Peter Sudau, Hilchenbach; Andreas Löhr, Herdorf, all of (DE)

(73) Assignee: SMS Schloemann-Siemag Aktiengesellschaft, Düsseldorf (DE)

( * ) Notice: Subject to any disclaimer, the term of this patent is extended or adjusted under 35 U.S.C. 154(b) by 0 days.

(21) Appl. No.: 09/052,425

(22) Filed: Mar. 31, 1998

(30) Foreign Application Priority Data

Apr. 14, 1997 (DE) .............................................. 197 15 523

(51) Int. Cl.[7] ...................................................... G01L 5/00
(52) U.S. Cl. ...................................................... 73/862.55
(58) Field of Search ........................ 73/862.55; 226/108

(56) References Cited

U.S. PATENT DOCUMENTS 4,367,832 * 1/1983 Fabian et al. ........................ 226/108

FOREIGN PATENT DOCUMENTS

| 4031666A | * 4/1991 | (DE) | .............................. B21B/41/00 |
| 4031666 | 3/1994 | (DE) . | |

* cited by examiner

*Primary Examiner*—Benjamin R. Fuller
*Assistant Examiner*—Jewel V. Thompson
(74) *Attorney, Agent, or Firm*—Friedrich Kueffner

(57) ABSTRACT

A planarity measuring roller is constructed as a loop lifter which is adjustable relative to a rolled strip. The loop lifter includes a plurality of measuring zones located next to one another over the width of the rolled strip. Each measuring zone includes a rotatably mounted individual measuring roller which is pivotable in a clockwise direction and interacts with a force measuring device. Each measuring roller is mounted in a pivotable housing-like lever frame. The pivot point of each lever frame, the point of rotation of the corresponding measuring roller and a force introduction point of the force measuring device arranged underneath of the pivot point of the lever frame form an approximately isosceles triangle.

5 Claims, 3 Drawing Sheets

PLANARITY MEASURING ROLLER

BACKGROUND OF THE INVENTION

1. Field of the Invention

The present invention relates to a planarity measuring roller constructed as a loop lifter which is adjustable relative to a rolled strip. The loop lifter includes a plurality of measuring zones located next to one another over the width of the rolled strip. Each measuring zone includes a rotatably mounted individual measuring roller which is pivotable in a clockwise direction and interacts with a force measuring device.

2. Description of the Related Art

A loop lifter of the above-described type was disclosed in DE-C2 40 31 666 as a control element for controlling the strip tension in strip rolling mills. The strip should preferably be without tension, i.e., a corresponding control variable should be zero. The loop lifter serving as a control element for controlling the strip tension is arranged, for example, at the exit side of a roll stand. The loop lifter has a plurality of measuring rockers arranged in pairs and distributed over the width of the loop lifter, wherein each measuring rocker has on one side a measuring roller facing the strip and a force measuring element on the other side.

In principle, the loop lifter or its individual measuring zones are constructed like a scale. Always two plate-shaped measuring rockers arranged parallel next to each other at a distance receive a measuring roller and have a pivot bearing screwed to a guide plate. Arranged additionally underneath the pivot bearing is a rotary axis for a height correction arm; this height correction arm is adjusted by several screws in such a way that the measuring roller is in a horizontal position. Each measuring roller is provided with two force measuring elements, wherein one force measuring element is provided at the measuring rocker and the other force measuring element is provided at a height correction arm. The height correction screws simultaneously constitute means for securing against lifting off. The configuration of the measuring zones of this known loop lifter make it necessary that the measuring roller has a degree of freedom in the horizontal plane. This is achieved by a cantilevered mounting by means of spherical roller bearings which are each arranged on an axis of the measuring rockers.

The two measuring rocker plates supporting each measuring roller have only a low stiffness in transverse direction, so that an appropriately large free space must remain between the individual measuring zones or measuring rocker plate pairs in order to prevent the plates from contacting each other. Because of the low stiffness of the measuring rocker plates and the cantilevered mounting of the measuring roller, there is the danger that the measuring rollers will be deflected out of the horizontal in the case of an eccentric load and that, as a result, the rolled strip is damaged by the raised roller edge on one side. When the measuring roller is inclined in this manner, there may also occur a contact with the measuring rocker which would lead to damage.

In this connection, especially endangered are the lubricant supply lines to the measuring roller bearings a damage of which would result in a failure of the bearing function. Finally, the friction resulting from a contact of the measuring rocker by the measuring roller would falsify the measurement. Furthermore, this loop lifter has many individual components which additionally must be mounted so as to be rotatable and, consequently, require a complicated lubrication. Also, the measuring rollers must not only be aligned in a time-consuming manner by means of many counterscrews and adjustment screws, but they must also be readjusted very frequently because they become loose or separated by the external loads and vibrations.

SUMMARY OF THE INVENTION

Therefore, it is the primary object of the present invention to provide a planarity measuring roller of the above-described type which does not have the disadvantages of the above-described loop lifter and is of particularly simple construction.

In accordance with the present invention, each measuring roller is mounted in a pivotable housing-like lever frame.

The lever frame in hollow box-type construction offers a very high stiffness which prevents inclined positions of the measuring rollers which are additionally preferably arranged on a continuous bearing axis. This makes it possible to arrange the individual lever frame segments of the loop lifter closely next to each other. As compared to the known embodiments, the planarity measuring roller or loop lifter according to the present invention can be of much flatter construction and can have a lighter weight and has significantly less mass especially in the area of the measuring roller. This makes it possible to achieve a substantially lower mass inertia moment which, particularly when manufacturing thin strips, results in significant advantages with respect to the strip tension control.

In accordance with a further development of the invention, the pivot points for the lever frames are provided on a shaft on which the force measuring devices are arranged. Consequently, the shaft, which may also be constructed as a hollow shaft in order to reduce the mass in this manner, has from the outset as many force measuring devices, for example, pressure pickups fastened by means of screws, as measuring zones or measuring rollers are desired. For pivoting the planarity measuring roller or the loop lifter into the strip travel path of the rolled strip, an adjusting cylinder is provided at least at one end of the shaft and the shaft is additionally equipped with a rotation sensor.

In accordance with a preferred embodiment of the invention, the pivot point of each lever frame, the point of rotation of the corresponding measuring roller and a force introduction point of the force measuring device arranged underneath of the pivot point of the lever frame form an approximately isosceles triangle. Since, in accordance with the present invention, these three points are connected to each other through a frame, wherein the connection between the points is subjected to tensile load or compressive load, it is possible to achieve an optimum stiffness and an optimum efficiency in force introduction due to the large lever arm from the point of rotation of the measuring roller to the rotary joint or pivot point of the lever frame.

It is possible to arrange the force measuring device perpendicularly of the connection line of the pivot point of the lever frame to the force introduction point and, thus, to transmit the strip tension in an advantageous manner to the force measuring device as a compressive force, and not as a tensile force as is the case in the known loop lifter. In addition, except for the bearings of the measuring rollers, only one joint is provided, namely in the area of the point of articulation or pivot point of the lever frame at the shaft, so that the unavoidable plays of the strip tension control due to finishing tolerances are much smaller than in conventional devices.

In accordance with an advantageous feature, a lift-off protection is provided outside of the triangle formed by the three points discussed above for each lever frame segment;

this ensures that the lever frame can be pivoted in a clockwise direction, but not in a counter-clockwise direction. The liftoff protection may be formed, for example, by a bolt inserted into a throughopening of the lever frame and into an aligned bore in a projection of the shaft, wherein the screw head has on the side of the lever frame some free space, for example, 0.1– 0.3 mm, from the lever frame when the lever frame is pivoted under the strip tension in the clockwise direction; alternatively, for example, a pretensioned screw may be provided for the same purpose, namely, to permit a movement in the clockwise direction and to prevent a movement in the counter-clockwise direction.

The modular construction of the planarity measuring rolling according to the present invention makes it possible, by loosening the lift-off protection which is freely accessible underneath the lever frame, to move any one or more lever frames in the counter-clockwise direction upwardly out of the loop lifter into a freely accessible position. This makes it possible to exchange an individual measuring roller or an entire lever frame segment or an individual force measuring device without having to disassemble the entire planarity measuring roller.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

DESCRIPTION OF THE PREFERRED EMBODIMENTS

Figure 1:
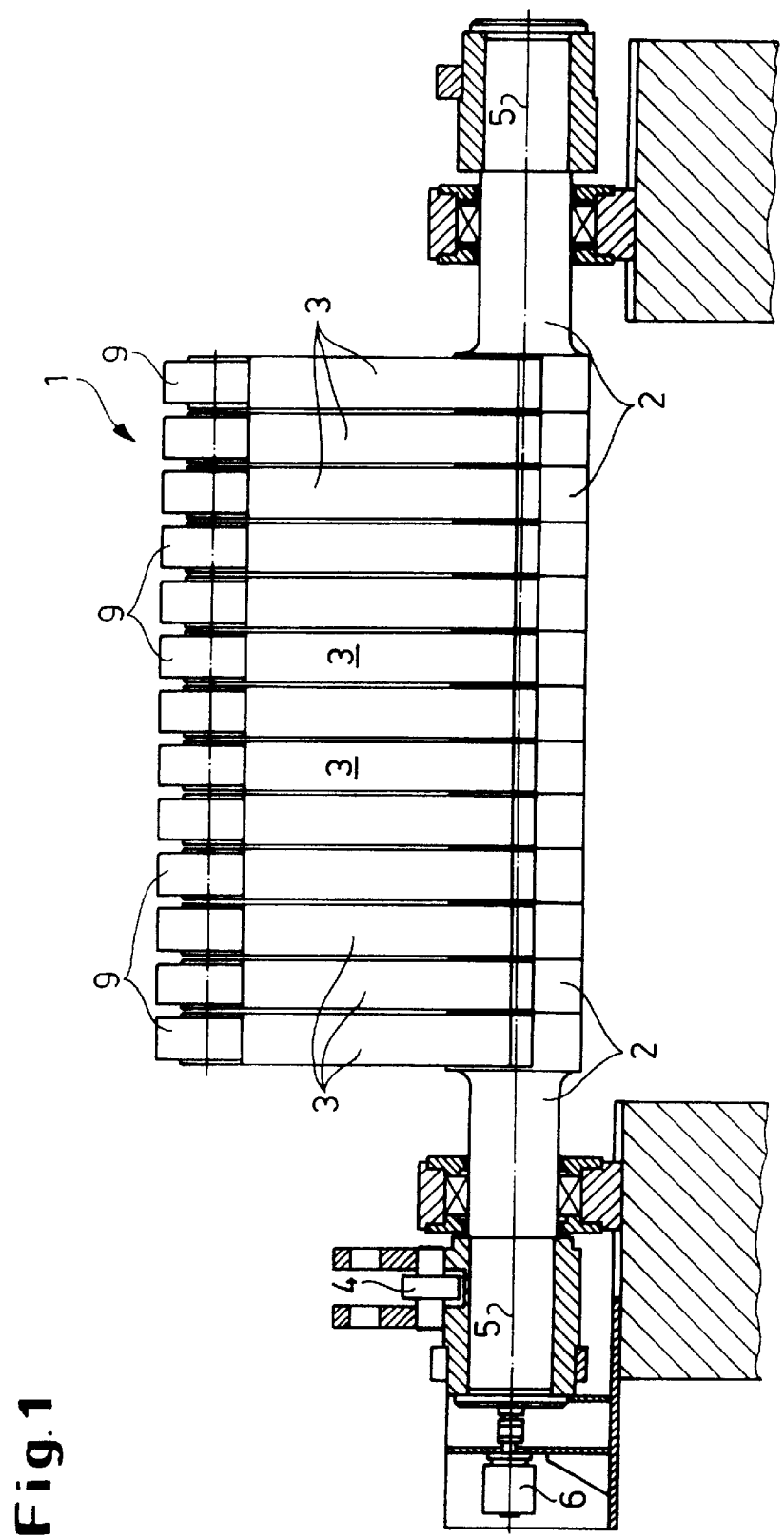
FIG. 1 is a top view, partially in section, of a planarity measuring roller composed of several lever frame segments.
Figure 2:
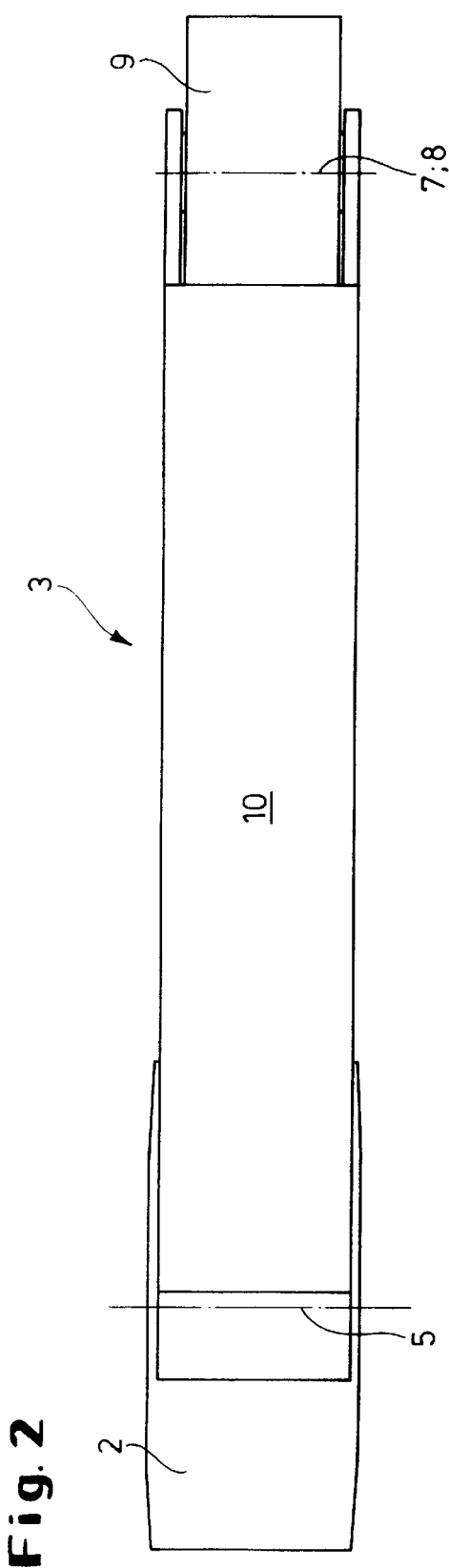
FIG. 2 is a top view, on a larger scale, of an individual lever frame segment.
Figure 3:
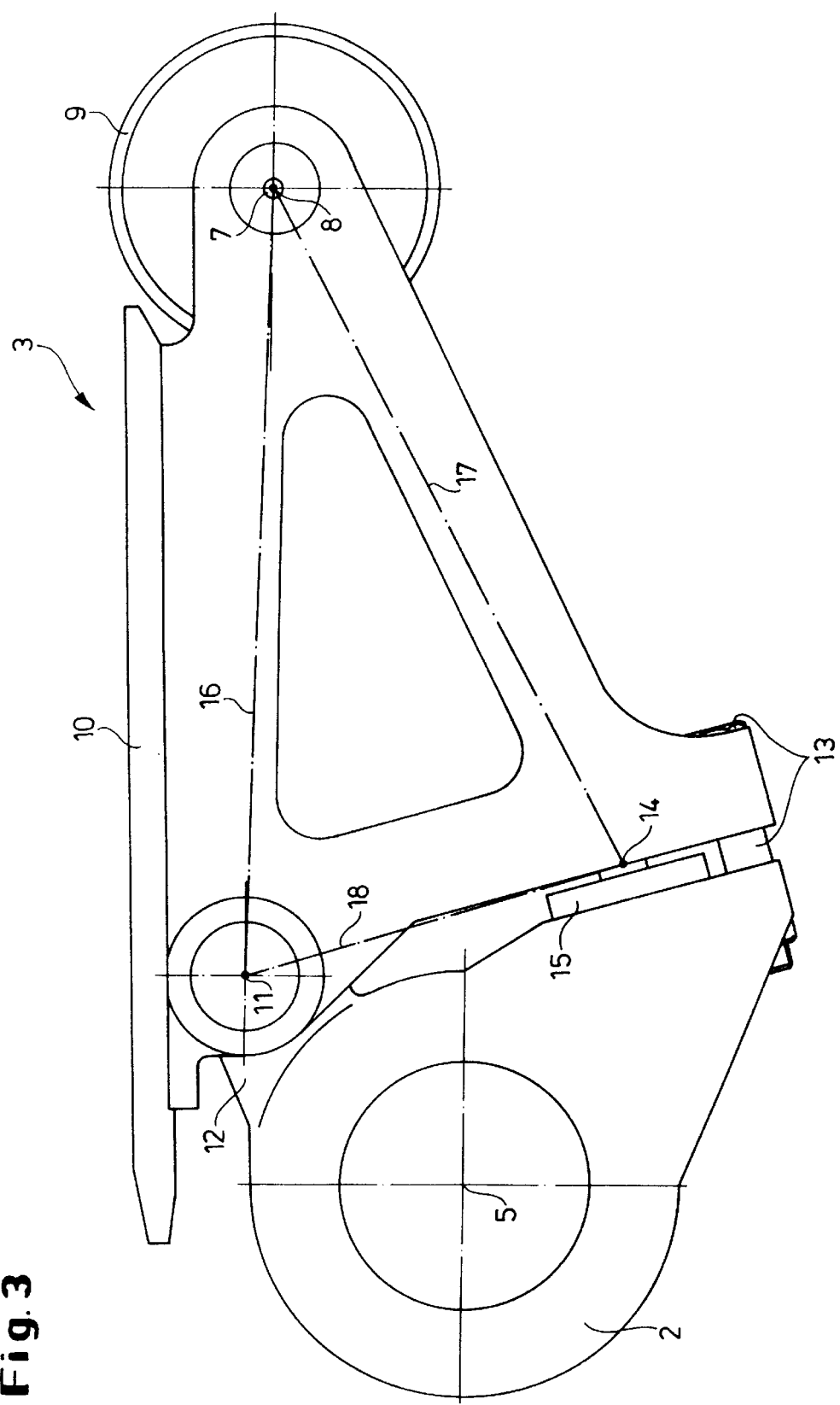
FIG. 3 is a side view of the lever frame segment of FIG. 2.

As illustrated in FIG. 1, a loop lifter in the form of a planarity measuring roller 1, arranged, for example, on the exit side following a roll stand of a strip rolling mill, includes a plurality of lever frames or lever frame segments 3 arranged closely next to each other on a shaft 2 constructed as a hollow shaft, as shown in FIG. 3. A piston rod 4 of an adjusting cylinder acts on the left end of the shaft 2 as seen in FIG. 2, so that the lever frames 3 are jointly adjusted about the axis 5 of rotation of the shaft 2, i.e., the lever frames 3 can be swung into the travel path of a rolled strip, not shown. By means of a rotation sensor 6 connected to the axis 5 of rotation of the shaft 2, the variable defining the adjustment of the planarity measuring roller or of the loop lifter 1 can be determined.

As illustrated in more detail in FIGS. 2 and 3, the lever frames 3 are constructed essentially as hollow-box structures which means that they have a high stiffness. Each lever frame 3 has at its forward end remote from the shaft 2 a measuring roller 9 rotatably mounted about the point 8 of rotation and supported with a continuous bearing axis 7. A guide plate 10 screwed to the upper side of the frame serves as a wear element for the rolled strip sliding thereon. The lever frames 3 are arranged in a cam-like projection 12 of the shaft 2 each in a point 11 of rotation in the form of an articulated joint.

By means of a lift-off protection device 13, it is ensured that the lever frame 3 can carry out a rotation in the clockwise direction, but not in the counter-clockwise direction. Provided above the lift-off protection device 13 is a force introduction point 14 which is provided with a force measuring device 15 of the shaft 2.

Accordingly, in addition to the pivot point 11 for the pivoting movement when strip tension occurs, the lever frames 3 have as integrated components additionally the point 8 of rotation of the measuring roller 9 and the introduction point 14, wherein, as seen in FIG. 3, the connecting lines 16 to 18 approximately form an isosceles triangle. Due to the large lever arm in accordance with the connecting line 16, i.e., between the pivot point 11 of the lever frame 3 and the point 8 of rotation of the measuring roller 9, an optimum efficiency is achieved in the transmission of the strip tension forces occurring at the measuring roller 9 to the force measuring device 15.

The lift-off protection device 13 located outside of the point 8 of rotation, the pivot point 11 and the force introduction point 15 makes it possible in a simple manner to make any of the lever frames freely accessible for the purpose of a complete exchange or an exchange of only the measuring roller 9, in spite of the very compact planarity measuring roller or loop lifter 1 composed of individual modular lever frames having a high stiffness. This is because, after releasing the lift-off protection device 13, the selected lever frame 3 can be pivoted about the pivot point 11 in a counter-clockwise direction and upwardly out of the arrangement, as is clear from FIG. 1. Consequently, it is not necessary to disassemble the planarity measuring roller or the loop lifter 1.

While specific embodiments of the invention have been shown and described in detail to illustrate the inventive principles, it will be understood that the invention may be embodied otherwise without departing from such principles.

We claim:

1. A planarity measuring roller comprising a loop lifter adjustable relative to a rolled strip, the loop lifter comprising a plurality of measuring zones located next to one another over a width of the rolled strip, each measuring zone comprising a rotatably mounted measuring roller, wherein the measuring roller is configured to interact with a force measuring device and is configured to be pivotable in a clockwise direction, wherein each measuring roller is supported in a pivotable lever frame.

2. The planarity measuring roller according to claim 1, wherein a pivot point of each lever frame is located on a shaft, wherein the force measuring devices are provided on the shaft.

3. The planarity measuring roller according to claim 1, further comprising a continuous bearing axis 7 for the measuring rollers.

4. The planarity measuring roller according to claim 2, wherein the pivot point of each lever frame, a point of rotation of the measuring roller and a force introduction point of the force measuring device located underneath the pivot point of the lever frame form an essentially isosceles triangle.

5. The planarity measuring roller according to claim 4, further comprising a lift-off protection means mounted outside of the isosceles triangle.

* * * * *